United States Patent
Panicker et al.

(10) Patent No.: US 12,314,404 B2
(45) Date of Patent: May 27, 2025

(54) METHOD AND SYSTEM FOR IDENTIFYING AN OPTIMIZED SET OF CODE COMMITS TO PERFORM VULNERABILITY REMEDIATION

(71) Applicant: Wipro Limited, Bangalore (IN)

(72) Inventors: Vinod Ramachandra Panicker, Kochi (IN); Sumod Rajan George, Ernakulam (IN); Arun Suresh, Kochi (IN)

(73) Assignee: Wipro Limited, Bangalore (IN)

( * ) Notice: Subject to any disclaimer, the term of this patent is extended or adjusted under 35 U.S.C. 154(b) by 243 days.

(21) Appl. No.: 18/157,849

(22) Filed: Jan. 23, 2023

(65) Prior Publication Data

US 2024/0169069 A1 May 23, 2024

(30) Foreign Application Priority Data

Nov. 18, 2022 (IN) .............................. 202241066138

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .......................... G06F 21/577; G06F 2221/033
See application file for complete search history.

(56) References Cited

U.S. PATENT DOCUMENTS

| | | | |
|---|---|---|---|
| 7,076,778 B2 | 7/2006 | Broderson et al. | |
| 8,438,558 B1 | 5/2013 | Adams | |
| 10,691,810 B1 * | 6/2020 | Freitag | G06F 8/71 |
| 11,308,218 B2 | 4/2022 | Nagaraja et al. | |
| 2010/0192128 A1 * | 7/2010 | Schloegel | G06F 11/3684 717/125 |
| 2013/0227695 A1 * | 8/2013 | Shankar | G06F 21/577 726/25 |

(Continued)

OTHER PUBLICATIONS

Ban, G., Xu, L., Xiao, Y. et al. B2SMatcher: fine-Grained version identification of open-Source software in binary files. Cybersecur 4, 21 (2021). https://doi.org/10.1186/s42400-021-00085-7.

*Primary Examiner* — Kambiz Zand
*Assistant Examiner* — Afaq Ali
(74) *Attorney, Agent, or Firm* — Finnegan, Henderson, Farabow, Garrett & Dunner, LLP.

(57) ABSTRACT

Embodiments of present disclosure relates to method and remediation system of performing remediation for managing vulnerabilities in application. The remediation system receives data related to source code associated with plurality of vulnerabilities and target code of application from one or more data sources. The remediation system identifies commit-log comprising plurality of code commits by extracting features, code commits and test cases from one or more data sources. The remediation system determines lower bound limit and upper bound limit to identify optimal code commits log from commit-log. Thereafter, the remediation system performs remediation by generating security patches for optimal code commits log. Thus, the present disclosure automatically identifies optimal code commits log for which security patches needs to be generated without any manual intervention.

18 Claims, 5 Drawing Sheets

(56) References Cited

U.S. PATENT DOCUMENTS

Figure 1:
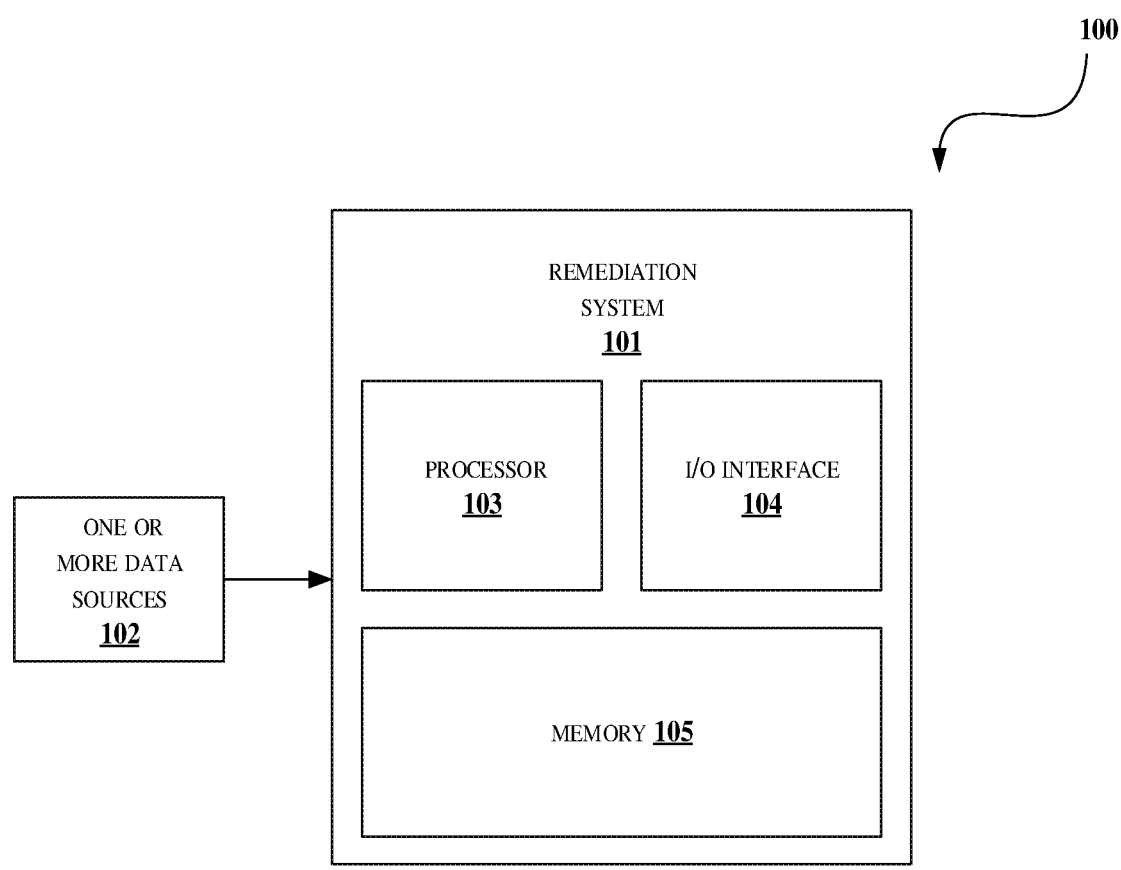

| | | | |
|---|---|---|---|
| 2018/0157842 A1* | 6/2018 | Holz | G06F 16/338 |
| 2018/0336356 A1* | 11/2018 | Papaxenopoulos | G06F 8/65 |
| 2020/0202007 A1* | 6/2020 | Nagaraja | G06F 11/3684 |
| 2021/0124830 A1* | 4/2021 | Dinh | G06F 21/577 |
| 2023/0004653 A1* | 1/2023 | Shiraishi | G06F 21/577 |
| 2024/0004623 A1* | 1/2024 | Groenewegen | G06F 8/42 |
| 2024/0020112 A1* | 1/2024 | Lin | G06F 11/3688 |
| 2024/0126542 A1* | 4/2024 | Thome | G06F 11/3604 |

\* cited by examiner

METHOD AND SYSTEM FOR IDENTIFYING AN OPTIMIZED SET OF CODE COMMITS TO PERFORM VULNERABILITY REMEDIATION

TECHNICAL FIELD

The present subject matter is related in general to identifying vulnerabilities in an application, more particularly, but not exclusively, the present subject matter relates to a method and system of performing remediation for managing vulnerabilities in an application.

BACKGROUND

Generally, while developing and maintaining a software source code, the source code undergoes frequent and continuous changes until a final release of the source code. During the frequent and continuous changes, there may be a large number of commits in the source code between two successive releases. The commits are accepted changes in the source code from one release to another release. Also, security risk/security vulnerability may vary for each of the release. Once a version of the software source code is released and it is being used by end-users, maintainer of the software needs to provide appropriate security patches in order to alleviate the security risks associated with the released version of the software. The term "security risk", "security vulnerability", "security weaknesses", and "vulnerability" may be used interchangeably throughout the document.

In another scenario, a distributor of software may need to maintain different released versions of the software and provide verified version (hardened version) of the software to end users. That is, a verified (hardened) version includes appropriate security patch along with the released version. Hardening is a process of securing a system or a software by reducing number of vulnerabilities associated with the system/software. The appropriate security patch may be developed manually and thus results in long cycle-time for development and verification of the security patch. Currently, existing systems overcome the above problem by generating automated security patch for a particular release of software. However, the existing systems do not consider a possibility of new vulnerabilities being introduced due to the security patch generation. Also, the existing systems are limited to pre-defined security fix rules for generating patches. Thus, the conventional way of patch validation performed for security vulnerability remediation is often limited to existing security vulnerability, while no attempts are performed to check if the security patch results in a new security vulnerability. This impacts effectiveness of the generated security patch and requires the end-users to re-generate security patch considering (i) the new security vulnerability and (ii) existing security vulnerability in the to-be-patched software application.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method of performing remediation for managing vulnerabilities in an application. The method comprises receiving data related to one or more source code associated with a plurality of vulnerabilities and a target source code of an application, from one or more data sources for generating a remediation workflow for the one or more source code. The method comprises identifying a commit-log comprising a plurality of code commits for the plurality of vulnerabilities of the one or more source code. The identification is performed by extracting one or more features associated with each code commit of the commit-log from the one or more data sources. Further, the identification is performed by extracting one or more test cases for each code commit based on the one or more features and exploit code associated with each code commit from the one or more data sources. The method comprises generating a traversal path from the one or more source code to the target source code based on the remediation workflow. The method comprises determining a lower bound limit and an upper bound limit in the traversal path to identify one or more optimal code commits log from the commit-log based on the extracted one or more test cases. Thereafter, the method comprises performing remediation for the one or more source code by generating one or more security patches for the one or more optimal code commits log based on a criteria associated with the plurality of vulnerabilities of the one or more source code.

In an embodiment, the present disclosure relates to a remediation system for performing remediation for managing vulnerabilities in an application. The remediation system includes a processor and a memory communicatively coupled to the processor. The memory stores processor-executable instructions, which on execution cause the processor to perform remediation for managing vulnerabilities in the application. The remediation system receives data related to one or more source code associated with a plurality of vulnerabilities and a target source code of an application, from one or more data sources for generating a remediation workflow for the one or more source code. The remediation system identifies a commit-log comprising a plurality of code commits for the plurality of vulnerabilities of the one or more source code. The identification is performed by extracting one or more features associated with each code commit of the commit-log from the one or more data sources. Further, the identification is performed by extracting one or more test cases for each code commit based on the one or more features and exploit code associated with each code commit from the one or more data sources. The remediation system generates a traversal path from the one or more source code to the target source code based on the remediation workflow. The remediation system determines a lower bound limit and an upper bound limit in the traversal path to identify one or more optimal code commits log from the commit-log based on the extracted one or more test cases. Thereafter, the remediation system performs remediation for the one or more source code by generating one or more security patches for the one or more optimal code commits log based on a criteria associated with the plurality of vulnerabilities of the one or more source code.

In an embodiment, the present disclosure relates to a non-transitory computer readable medium including instructions stored thereon that when processed by at least one processor may cause a remediation system to receive data related to one or more source code associated with a plurality of vulnerabilities and a target source code of an application, from one or more data sources for generating a remediation workflow for the one or more source code. The instruction causes the processor to identify a commit-log comprising a plurality of code commits for the plurality of vulnerabilities of the one or more source code. The identification is performed by extracting one or more features associated with each code commit of the commit-log from the one or more data sources. Further, the identification is performed by extracting one or more test cases for each code commit based on the one or more features and exploit code associated with each code commit from the one or more data sources. Further, the instruction causes the processor to generate a traversal path from the one or more source code to the target source code based on the remediation workflow. The instruction causes the processor to determine a lower bound limit and an upper bound limit in the traversal path to identify one or more optimal code commits log from the commit-log based on the extracted one or more test cases. Thereafter, the instruction causes the processor to perform remediation for the one or more source code by generating one or more security patches for the one or more optimal code commits log based on a criteria associated with the plurality of vulnerabilities of the one or more source code.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

Figure 2A:
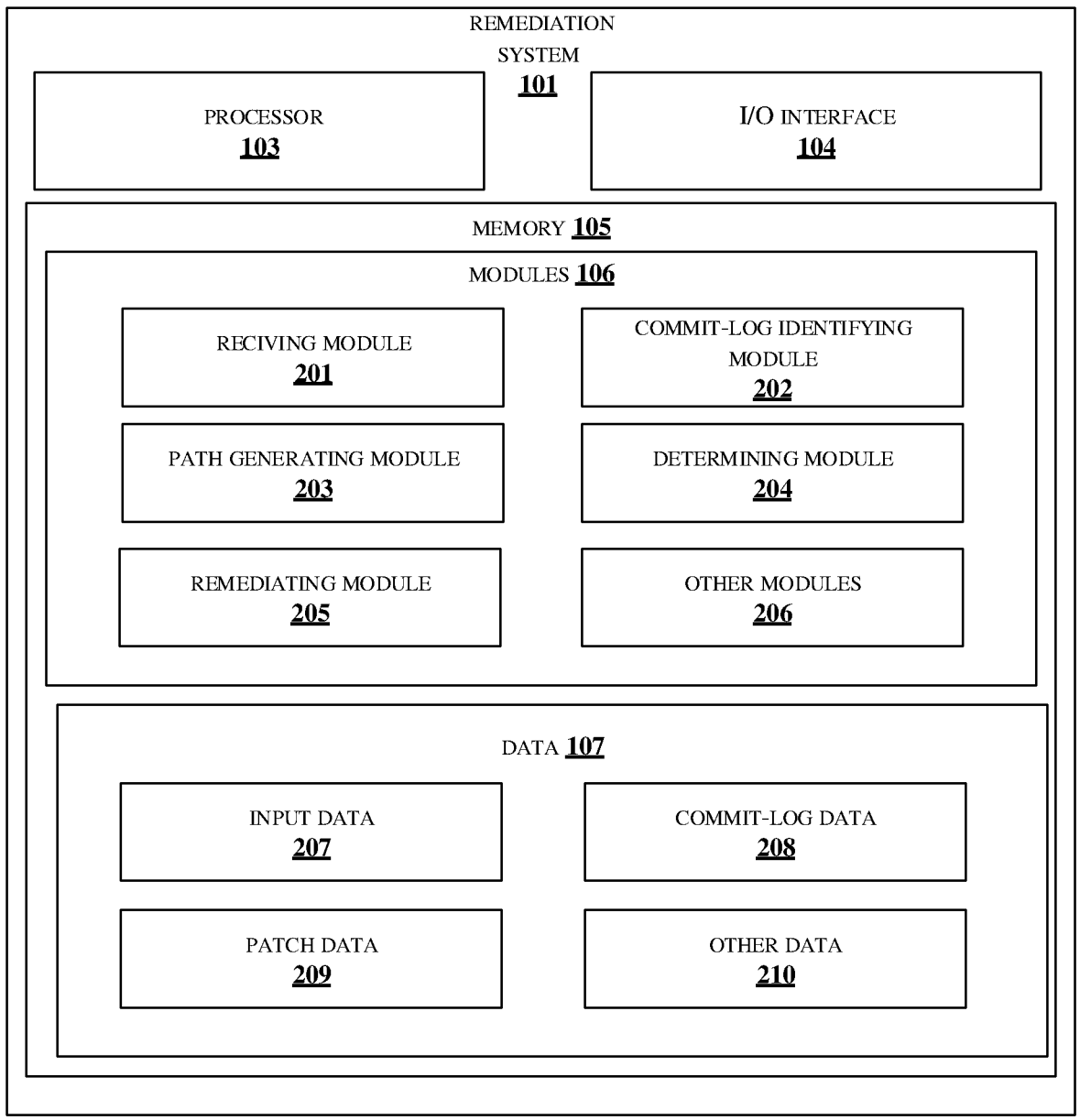
Figure 2B:
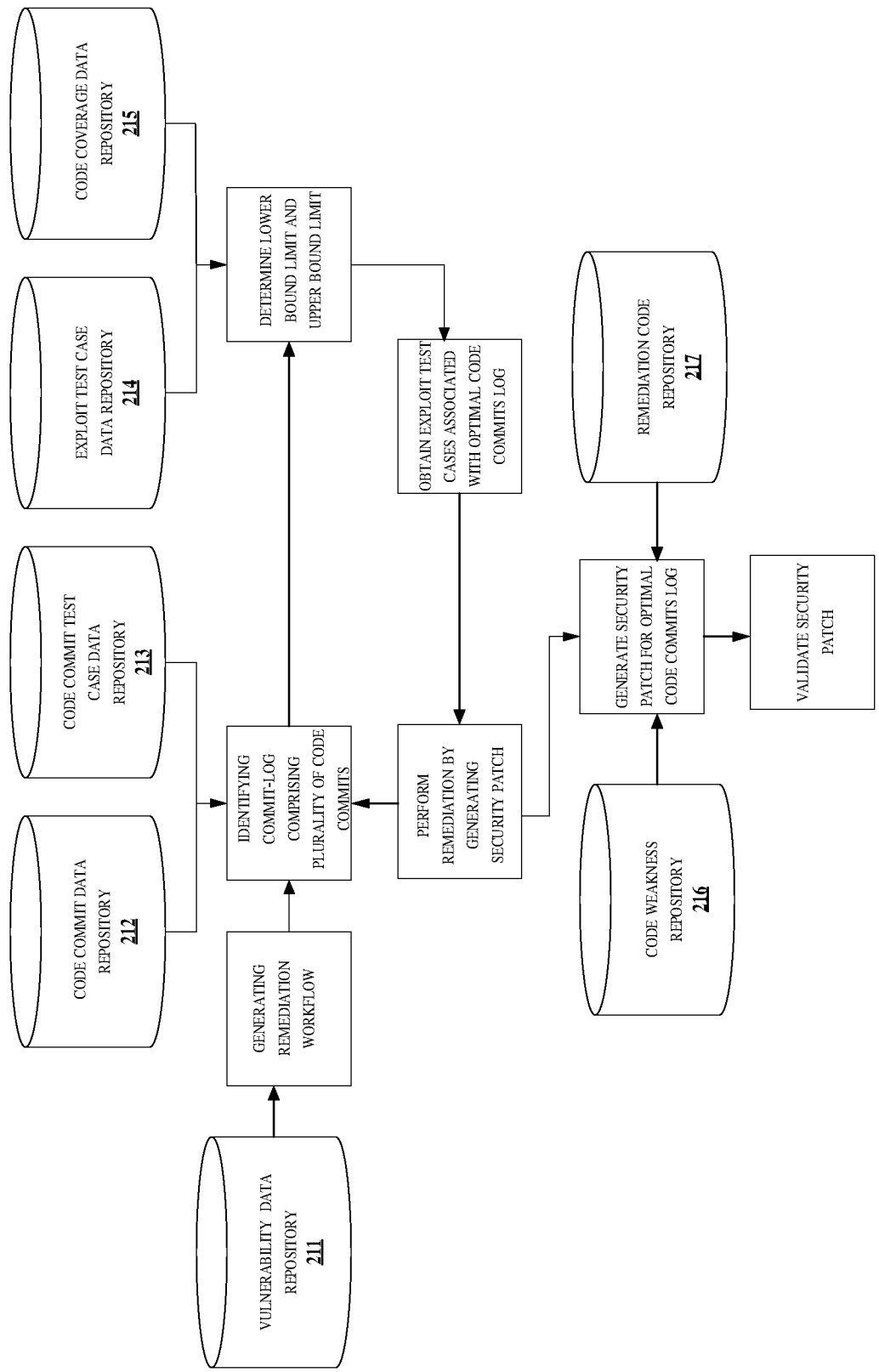
Figure 3:
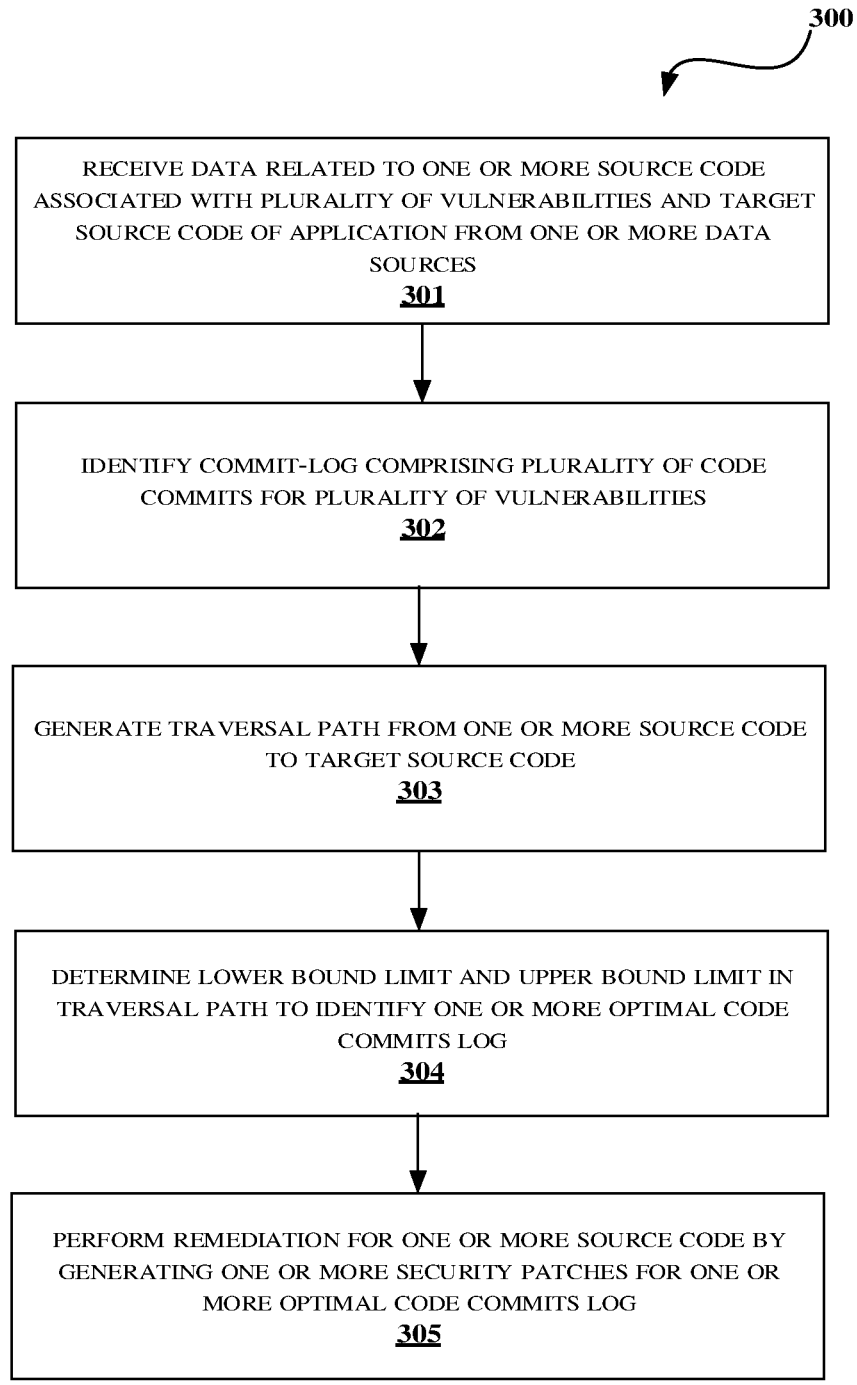
Figure 4:
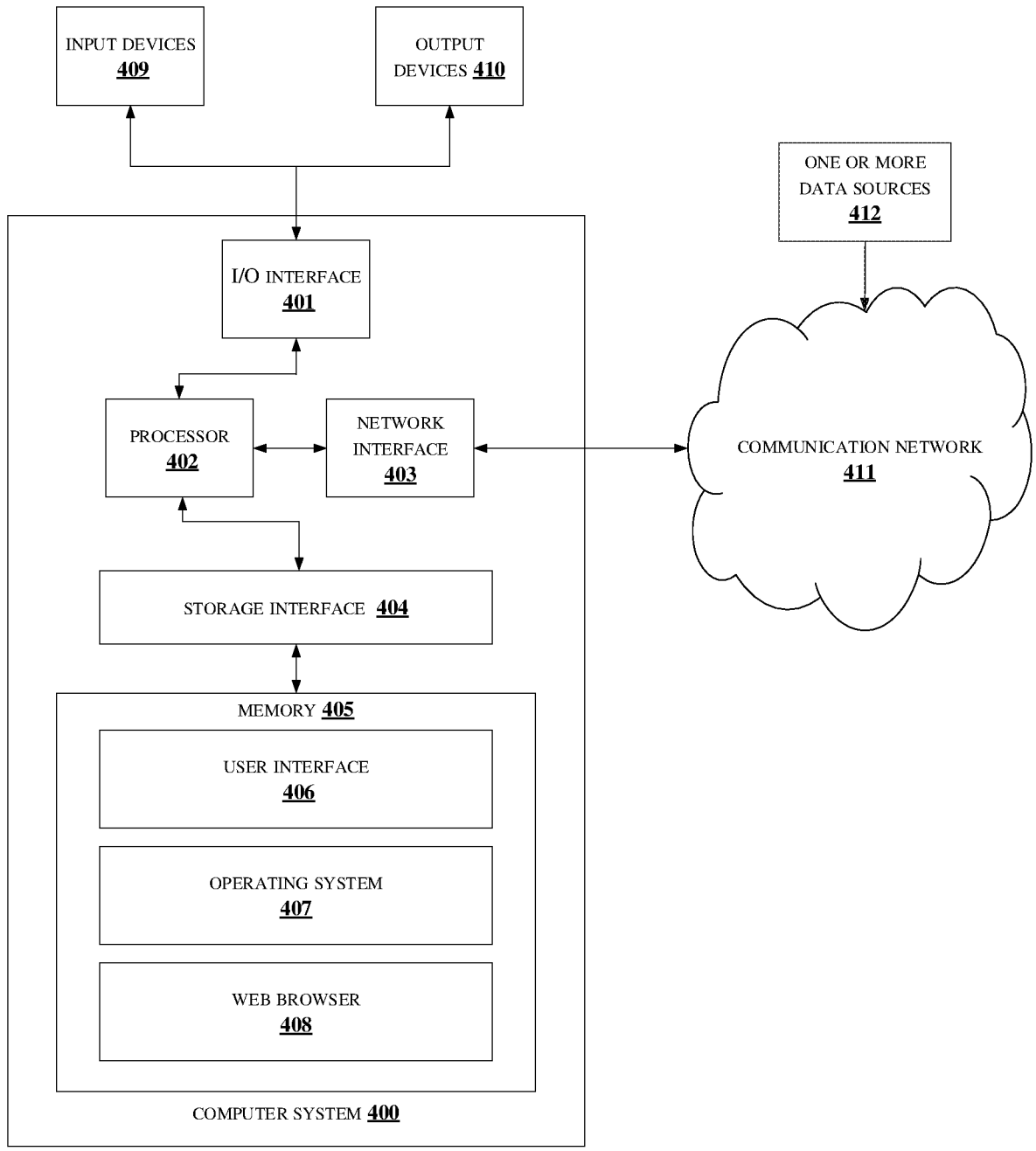

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 1 shows an exemplary environment for performing remediation for managing vulnerabilities in an application, in accordance with some embodiments of the present disclosure;

FIG. 2*a* shows a detailed block diagram of a remediation system for performing remediation for managing vulnerabilities in an application, in accordance with some embodiments of the present disclosure;

FIG. 2*b* shows exemplary environment illustrating data flow between different components of remediation system for performing remediation for managing vulnerabilities in an application, in accordance with some embodiments of present disclosure;

FIG. 3 illustrates a flow diagram showing exemplary method for performing remediation for managing vulnerabilities in an application, in accordance with some embodiments of present disclosure; and FIG. 4 illustrates a block diagram of an exemplary computer system for implementing embodiments consistent with the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device, or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Present disclosure relates to a method and a remediation system for performing remediation for managing vulnerabilities in an application. Generally, source code of the application may undergo frequent and continuous changes until final release of the source code. The source code may comprise many vulnerabilities which may be corrected by manual generation of security patches. The manual generation of the security patches may be time-consuming and include further new vulnerabilities that are introduced while implementing the security patches to alleviate/remediate the existing/known security vulnerabilities on the source code. To overcome the above problem, the present disclosure receives data related one or more versions of source code and target code of the application from one or more data sources. The one or more versions of source code may include plurality of vulnerabilities. The present disclosure traverses from the one or more versions of the source code to the target code and identify code commits for the plurality of vulnerabilities. The present disclosure may also identify test cases and exploit test cases related to the code commits and determine code coverage of the one or more versions of the source code. The present disclosure utilises the test cases and exploit test cases to identify optimal set of code commits and generate security patches for the optimal set of code commits. Thereafter, the present disclosure validates the security patches to identify any further new vulnerabilities. Thus, the present disclosure reduces time required for generating security patches and identifies new vulnerabilities generated due to security patches. Thereby, acting/remediating the code commits for the security vulnerabilities in a time bound manner without accumulating backlog of the security vulnerabilities.

FIG. 1 shows an exemplary environment 100 for performing remediation for managing vulnerabilities in an application. The exemplary environment 100 includes a remediation system 101 and one or more data sources 102. The one or more data sources 102 comprises a plurality of databases. The plurality of databases may include, but is not limited to, a vulnerability data repository, a code commit data repository, a code commit test case data repository, an exploit test case data repository, a code coverage data repository, a code weakness repository, a remediation code repository, and the like. The plurality of databases is explained subsequently under FIG. 2b. In an embodiment, the remediation system 101 may interact with the one or more data sources 102 to perform remediation for managing vulnerabilities in the application. The application may include, but is not limited to, a web application, a mobile application, a simulation application, and the like. The application may be a computer software package that performs a specific function for an end user, or another application based on designed features. The remediation system 101 may be implemented in a variety of computing systems, such as, a laptop computer, a desktop computer, a Personal Computer (PC), a notebook, a smartphone, a tablet, e-book readers, a server, a network server, a cloud-based server, and the like. In an embodiment, the remediation system 101 may be a dedicated server or may be a cloud-based server. Further, the remediation system 101 may include a processor 103, a I/O interface 104, and a memory 105. In some embodiments, the memory 105 may be communicatively coupled to the processor 103. The memory 105 stores instructions, executable by the processor 103, which, on execution, may cause the remediation system 101 to perform remediation for managing vulnerabilities in the application, as disclosed in the present disclosure.

The remediation system 101 may communicate with the one or more data sources 102 via a communication network (not show explicitly in FIG. 1). In an embodiment, the communication network may include, without limitation, a direct interconnection, Local Area Network (LAN), Wide Area Network (WAN), Controller Area Network (CAN), wireless network (e.g., using a Wireless Application Protocol), the Internet, and the like.

In an example, there may be multiple versions of the application before a final release of the application. Some of the versions may include vulnerabilities related to security, while in some versions, the vulnerabilities may be fixed. When the remediation system 101 identifies certain vulnerabilities in a version of the application, the remediation system 101 may receive data from the one or more data sources 102. The data may be related to one or more source code and target source code of the application. The one or more source code may be associated with a plurality of vulnerabilities. The one or more source code may refer to one or more versions of the application. For example, the one or more source code may be a first version of the application/software, a second version of the application, and the like. The target source code may be a final version or a recent/current version of the application. For example, if there are three versions of the application such as, the first version, the second version and a third version. The first and the second version of the application may be the one or more source code and the third version of the application may be the target source code. The data comprises vulnerability data and configuration data related to the one or more source code and the target source code. The remediation system 101 may utilises the data for generating a remediation workflow for the one or more source code. In an embodiment, the remediation workflow may refer to a process of initiating generation of a security patch for the plurality of vulnerabilities. In an embodiment, the remediation workflow may include sequence of steps that may be followed to generate the security patch for the plurality of vulnerabilities. In an embodiment, the remediation workflow may include, but is not limited to, release of the target source code, release of the one or more source code, the plurality of vulnerabilities for remediation, current criticality index for software component, and the like for generating the security patch. The remediation system 101 may obtain details of the target release of the application, current release of the application, and the plurality of vulnerabilities from the vulnerability data repository. In an embodiment, the remediation system 101 may prioritize the plurality of vulnerabilities based on their severity levels. The remediation system 101 may define the remediation workflow for the one or more source code based on the priority of the plurality of vulnerabilities.

Further, the remediation system 101 may identify a commit-log comprising a plurality of code commits for the plurality of vulnerabilities of the one or more source code. For identifying the commit-log, the remediation system 101 may extract one or more features associated with each code commit of the commit-log from the code commit data repository. Further, for identifying the commit-log, the remediation system 101 may extract one or more test cases for each code commit based on the one or more features and exploit code associated with each code commit from the code commit test case data repository.

Thereafter, the remediation system 101 may generate a traversal path for traversing from the one or more source code to the target source code based on the remediation workflow. In an embodiment, the remediation system 101 may generate scripts for the traversal path between the one or more source code and the target source code by populating the one or more features associated with each code commit with a corresponding test case. Further, the remediation system 101 may determine a lower bound limit and an upper bound limit in the traversal path to identify one or more optimal code commits log from the commit-log based on the extracted one or more test cases. In an embodiment, the lower bound limit is identified by traversing from the one or more source code to the target source code and eliminating one or more code commits from the commit-log based on failure of exploit test cases associated with the one or more code commits. That is, the remediation system 101 may perform a reverse traversal and checks for failure of exploit test cases associated with the one or more code commits. When the exploit test cases fail, the one or more code commits are eliminated from the commit-log and thus, obtaining the lower bound limit. Similarly, the upper bound limit is identified by traversing from the target source code to the one or more source code and eliminating features of the target source code based on failure of test cases related to the features. That is, the remediation system 101 may perform a forward traversal and checks for failures of test cases related to the features of the target source code. When the test cases fail, the features are eliminated, and the upper bound limit is obtained. Thereafter, the remediation system 101 may perform remediation for the one or more source code by generating one or more security patches for the one or more optimal code commits log based on a test-case criteria associated with the plurality of vulnerabilities of the one or more source code. In an embodiment, the criteria may be determined by obtaining one or more exploit test cases associated with the one or more optimal code commits log from the exploit-to-exploit test case data repository. In an embodiment, the one or more exploit test case may be associated with the plurality of vulnerabilities. In an embodiment, when the one or more exploit test cases associated with the plurality of vulnerabilities is not obtained from the exploit-to-exploit test case data repository, the remediation system 101 may obtain exploit test cases from a user. The user may be, but is not limited to, a programmer, a developer, and the like. The remediation system 101 may determine refined test-case criteria that indicates a need for additional test-case to be executed based on the one or more exploit test cases.

In an example, additional test-case criteria comprise the critically value/index and the code coverage value/index for the plurality of vulnerabilities of the one or more source code. That is, the critically value/index for the plurality of vulnerabilities of the one or more source code may be re-calculated based on the one or more exploit test cases that are identified and obtained from the exploit-to-exploit test case data repository. In an embodiment, upon re-calculation of the criticality index, the remediation system 101 may identify and extract corresponding code coverage index from the code coverage index data repository. The remediation system 101 uses list of code changes, list of test cases that should be considered for the security patch generation, list of exploits and the refined test-case criteria of criticality index and code coverage index. Further, the remediation system 101 generates additional test cases based on the list of code changes identified from the code commit traversals and the list of exploits. These additional test cases may facilitate the validation and optimization of the code commit logs.

In an example, the remediation system 101 may be configured to check if outcomes from the execution of test cases meets a pre-defined code coverage value and criticality index value. In an example, a check for code coverage is made based on the successful completion of test case execution and status of the exploit test cases. If the code coverage or status of the exploit test case execution is not meeting specified objectives, a revision to bounds (i.e., upper limit bound and lower limit bound) of the code commit log is triggered. If the code coverage or status of the exploit test case execution is meeting the specified objectives, the optimal code of commit logs, list of code changes, test cases and the criteria are used for generating. The specified objectives may be defined as successful remediation of the code commits that resulted in the vulnerability, on applying the one or more security patches (potential software code patch) to the source codes of software application.

Further, the remediation system 101 may identify a weakness pattern between the one or more source code and the target source code based on security weakness information of the one or more source code obtained from the code weakness repository. The weakness information is indicative of new security weaknesses to confirm if the generated patch is sufficient or needs to be refactored. The remediation system 101 may extract information associated with the weakness pattern from the remediation code substitution repository. In an embodiment, the remediation system 101 may compare the weakness information against the weakness pattern from the code weakness repository. Once the weakness pattern is identified, the weakness pattern is compared against the information from the remediation code substitution repository. The remediation system 101 may generate the one or more security patches for the one or more optimal code commits log based on the weakness pattern and the corresponding information. In an embodiment, the remediation system 101 may validate the one or more security patches by executing the one or more security patches for the one or more optimal code commits log. In this way, an automated patch generation may alleviate all known security vulnerabilities without introduction of further/new vulnerabilities through the generated security patch. The remediation system 101 performs the validation to identify if any new vulnerabilities are generated due to the one or more security patches. In an embodiment, if any new vulnerabilities are identified, the remediation system 101 may initiate the process of security patch generation for the new vulnerabilities.

FIG. 2a shows a detailed block diagram of a remediation system for performing remediation for managing vulnerabilities in an application, in accordance with some embodiments of the present disclosure.

Data 107 and one or more modules 106 in the memory 105 of the remediation system 101 is described herein in detail.

In one implementation, one or more modules 106 may include, but are not limited to, a receiving module 201, a commit-log identifying module 202, a path generating module 203, a determining module 204, a remediating module 205, and other modules 206, associated with the remediation system 101.

In an embodiment, the data 107 in the memory 105 may include input data 207, commit-log data 208, patch data 209, and other data 210 associated with the remediation system 101.

In an embodiment, the data 107 in the memory 105 may be processed by the one or more modules 106 of the remediation system 101. The one or more modules 106 may be configured to perform the steps of the present disclosure using the data 107, for performing remediation for managing vulnerabilities in the application. In an embodiment, each of the one or more modules 106 may be a hardware unit which may be outside the memory 105 and coupled with the remediation system 101. In an embodiment, the one or more modules 106 may be implemented as dedicated units and when implemented in such a manner, said modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality.

One or more modules 106 of the remediation system 101 function to perform remediation for managing vulnerabilities in the application. The one or more modules 106 along with the data 107, may be implemented in any system, for performing remediation for managing vulnerabilities in the application.

The input data 207 may include information from the one or more data sources 102. The one or more data sources 102 comprises the plurality of databases. The plurality of databases may include, but is not limited to, vulnerability data repository, code commit data repository, code commit test case data repository, exploit test case data repository, code coverage data repository, code weakness repository, remediation code repository and the like. The plurality of databases is explained under FIG. 2b.

The commit-log data 208 may include information regarding plurality of code commits for the plurality of vulnerabilities of the one or more source code.

The patch data 209 may include information regarding one or more security patches. The one or more security patches are generated for one or more optimal code commits. The information may include, but is not limited to, security patch related to each optimal code commit logs.

The other data 210 may store data, including temporary data and temporary files, generated by modules for performing the various functions of the remediation system 101.

The receiving module 201 may receive the data related to the one or more source code associated with plurality of vulnerabilities and the target source code from the one or more data sources 102. The plurality of vulnerabilities may be a security flaw, a glitch, or a weakness identified in the one or more source code of the application that could be exploited by an attacker. The one or more data sources 102 comprises the plurality of databases as indicated in FIG. 2b. Initially, the receiving module 201 may obtain vulnerability data and configuration data related to the one or more source code and the target source code of the application from the vulnerability data repository 211 as shown in FIG. 2b. The vulnerability data repository 211 may include details regarding target code of the application, one or more source code of the application, the plurality of vulnerabilities related to the one or more source code, and the like. In an embodiment, the vulnerability data may be pre-generated data for the application. The remediation system 101 may utilises the vulnerability data for generating the remediation workflow for the one or more source code.

The commit-log identifying module 202 may identify the commit-log comprising plurality of code commits for the plurality of vulnerabilities. The commit-log identifying module 202 may extract one or more features associated with each code commit of the commit-log from the code commit data repository 212 as shown in FIG. 2b. The code commit data repository 212 may include mapping details regarding features and code commits related to the features that may introduce or enhance functional capabilities of the one or more source code. In an embodiment, the code commit data repository 212 may be updated for every release of the one or more source code. Further, the features may be lines of codes of the application. In an embodiment, the commit-log identifying module 202 may map the plurality of vulnerabilities to their relevant features and code commits. Further, the commit-log identifying module 202 may extract one or more test cases for each code commit based on the one or more features and exploit code associated with each code commit from the code commit test case data repository 213 as shown in FIG. 2b. The code commit test case data repository 213 may include mapping details regarding test cases related to each code commit of the one or more source code. In an embodiment, the code commit test case data repository may be updated for every release of the one or more source code. In an embodiment, the commit-log identifying module 202 may map each of the code commit with relevant test cases to identify the commit-log.

The path generating module 203 may generate traversal path from the one or more source code to the target source code based on the remediation workflow. In an embodiment, the path generating module 203 may generate scripts for the traversal path between the one or more source code and the target source code, by populating the one or more features associated with each code commit with a corresponding test case. The determining module 204 may determine the lower bound limit and the upper bound limit in the traversal path to identity one or more optimal code commits log. The lower bound limit and the upper bound limit may be identified using one or more techniques. The one or more techniques may include reverse traversal and forward traversal. A person skilled in the art may understand that the lower bound limit and the upper bound limit may be identified by other techniques and is not limited to the techniques mentioned above. In an embodiment, the determining module 204 may identify the lower bound limit by traversing from the one or more source code to the target source code and eliminating one or more code commits from the commit-log based on failure of exploit test cases associated with the one or more code commits. Similarly, the determining module 204 may identify the upper bound limit by traversing from the target source code to the one or more source code and eliminating features of the target source code based on failure of test cases related to the features. For example, consider there are hundred plurality of code commits and the determining module 204 may identify fifty optimal code commits log by identifying the lower bound limit and the upper bound limit. The lower bound limit may be twenty and the upper bound limit may be seventy. Further, the remediating module 205 may perform remediation for the one or more source code by generating the one or more security patches for the one or more optimal code commits log based on a criteria associated with the plurality of vulnerabilities of the one or more source code. In an embodiment, the criteria are determined by obtaining one or more exploit test cases associated with the one or more optimal code commits log from the exploit test case data repository 214 as shown in FIG. 2b. The exploit test case data repository 214 may include mapping details regarding exploit code and exploit test cases related to the plurality of vulnerabilities. In an embodiment, when the one or more exploit test cases associated with the one or more optimal code commits of the plurality of vulnerabilities is not obtained from the exploit test case data repository 214, the remediating module 205 may obtain exploit test cases from the user. The remediating module 205 may determine the criteria based on the one or more exploit test cases. In an embodiment, upon determining, the remediating module 205 may identify and extract corresponding code coverage index from the code coverage data repository 215 as shown in FIG. 2b. The criteria comprise the criticality value/index and the code coverage value/index for the plurality of vulnerabilities of the one or more source code. The code coverage data repository 215 may include mapping details regarding criticality index of the one or more source code and code coverage index of the one or more source code.

Further, the remediating module 205 may identify a weakness pattern between the one or more source code and the target source code based on weakness information of the one or more source code obtained from the code weakness repository 216 as shown in FIG. 2b. The code weakness repository 216 may include details regarding code weakness of the one or more source code. In an embodiment, the code weakness is utilised to determine weakness pattern of the one or more source code. The weakness information may be an error/defect in the one or more source code of the application that may enable a hacker to exploit the application. The remediating module 205 may extract information associated with the weakness pattern from the remediation code repository 217 of FIG. 2*b*. The remediation code repository 217 may include details regarding codes associated with the weakness pattern. In an embodiment, the remediating module 205 may compare the weakness information against the weakness pattern and then compare the weakness pattern against the information from the remediation code repository 217. Thus, the repositories 212-217 stores various mapping details that can be used as a quick reference by the remediation system 101, to alleviate the security vulnerabilities in the software code application/components in a time-bound manner.

Upon identifying the information, the remediating module 205 may generate the one or more security patches for the one or more optimal code commits log based on the weakness pattern and the corresponding information. Further, in an embodiment, the remediating module 205 may validate the one or more security patches by executing the one or more security patches for the one or more optimal code commits log. The remediation system 101 performs the validation to identify new vulnerabilities which may be generated due to the one or more security patches. In an embodiment, if new vulnerabilities are identified, the remediating module 205 may initiate the process of security patch generation for the new vulnerabilities. However, if no new vulnerabilities are generated due to the one or more security patches, the remediating module 205 may apply the one or more security patches to the one or more source code and submit the one or more source code to end-users.

The one or more modules 106 may also include other modules 206 such as a validating module and an extracting module to perform various miscellaneous functionalities of the remediation system 101. The extracting module may extract features and their test cases from the one or more data sources 102. The validating module may validate the generated one or more security patches. The validating module may verify if the generated one or more security patches remediates all the plurality of vulnerabilities. The validating module may also identify any new vulnerabilities generated due to the one or more security patches. In case verification is unsuccessful, then the validating module may trigger the generation of the remediation workflow. In case verification is successful, the validating module may publish the one or more security patches to a source code repository. It will be appreciated that such modules may be represented as a single module or a combination of different modules.

Consider an exemplary use case for performing remediation for managing vulnerabilities in an application. For example, consider a version v1 of an application as a source code and version v2 as a target source code. The version v1 may be identified with a plurality of vulnerabilities that may be exploited by a hacker. The plurality of vulnerabilities may be corrected in version v2 by introducing code changes. The accepted code changes may be referred as the code commits. Each code commit may include a unique commit id. The code commits for the plurality of vulnerabilities may be identified by the remediation system 101. Further, the remediation system 101 may generate security patches to remediate the plurality of vulnerabilities. For generating the security patches, the remediation system 101 performs code traversal from v1 to v2 and vice versa to identify the code commits and their corresponding test cases for generating the security patch. While traversing, the remediation system 101 may map the features of the v1 to their code commits, and corresponding test cases from the one or more data sources 102. In an embodiment, the remediation system 101 may identify optimal code commits between a lower bound limit and an upper bound limit. The remediation system 101 identifies the lower bound limit and the upper bound limit based on the test cases. For example, consider there are hundred code commits and the remediation system 101 may identify fifty optimal code commits by identifying the lower bound limit and the upper bound limit. The lower bound limit may be fifty and the upper bound limit may be eighty. Further, the remediation system 101 may re-calculate criticality index based on exploit test cases identified from the one or more data sources 102 for the fifty optimal code commits. Thereafter, the remediation system 101 may identify weakness pattern between the v1 and the v2 based on weakness information of the v1 obtained from the one or more data sources 102. Once the weakness pattern is identified, the weakness pattern may be compared against the information from the one or more data sources 102. The remediation system 101 may generate the security patches for the fifty optimal code commits based on the weakness pattern and the corresponding information. The remediation system 101 may also validate the security patches by executing the security patches for the fifty optimal code commits. The remediation system 101 performs the validation to identify if any new vulnerabilities are generated due to the security patches.

FIG. 3 illustrates a flow diagram showing exemplary method for performing remediation for managing vulnerabilities in an application, in accordance with some embodiments of present disclosure.

As illustrated in FIG. 3, the method 300 may include one or more blocks for executing processes in the remediation system 101. The method 300 may be described in the general context of computer executable instructions. Generally, computer executable instructions can include routines, programs, objects, components, data structures, procedures, modules, and functions, which perform particular functions or implement particular abstract data types.

The order in which the method 300 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, receiving, by the receiving module 201, data related to one or more source code associated with a plurality of vulnerabilities and a target source code of an application, from one or more data sources 102 for generating a remediation workflow for the one or more source code. The data comprises vulnerability data and configuration data related to the one or more source code and the target source code. The one or more data sources 102 comprises a plurality of databases.

At block 302, identifying, by the commit-log identifying module 202, the commit-log comprising the plurality of code commits for the plurality of vulnerabilities of the one or more source code. Particularly, the commit-log identifying module 202 may extract one or more features associated with each code commit of the commit-log from the one or more data sources 102. Further, the commit-log identifying module 202 may extract one or more test cases for each code commit based on the one or more features and exploit code associated with each code commit from the one or more data sources 102.

At block 303, generating, by the path generating module 203, the traversal path from the one or more source code to the target source code based on the remediation workflow. Particularly, the path generating module 203 may generate scripts for the traversal path between the one or more source code and the target source code by populating the one or more features associated with each code commit with a corresponding test case.

At block 304, determining, by the determining module 204, the lower bound limit and the upper bound limit in the traversal path to identify one or more optimal code commits log from the commit-log based on the extracted one or more test cases. Particularly, the determining module 204 may identify the lower bound limit by traversing from the one or more source code to the target source code and eliminating one or more code commits from the commit-log based on failure of exploit test cases associated with the one or more code commits. Similarly, the upper bound limit is identified by traversing from the target source code to the one or more source code and eliminating features of the target source code based on failure of test cases related to the features.

At block 305, performing, by the remediating module 205, remediation for the one or more source code by generating one or more security patches for the one or more optimal code commits log based on a criteria associated with the plurality of vulnerabilities of the one or more source code. Particularly, the remediating module 205 may identify weakness pattern between the one or more source code and the target source code based on weakness information of the one or more source code obtained from the one or more data sources 102. Further, extracting information associated with the weakness pattern from the one or more data sources 102. Thereafter, generating the one or more security patches for the one or more optimal code commits log based on the weakness pattern and the corresponding information.

Computing System

FIG. 4 illustrates a block diagram of an exemplary computer system 400 for implementing embodiments consistent with the present disclosure. In an embodiment, the computer system 400 is used to implement the remediation system 101. The computer system 400 may include a central processing unit ("CPU" or "processor") 402. The processor 402 may include at least one data processor for executing processes in Virtual Storage Area Network. The processor 402 may include specialized processing units such as, integrated system (bus) controllers, memory management control units, floating point units, graphics processing units, digital signal processing units, etc.

The processor 402 may be disposed in communication with one or more input/output (I/O) devices 409 and 410 via I/O interface 401. The I/O interface 401 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 401, the computer system 400 may communicate with one or more I/O devices 409 and 410. For example, the input devices 409 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 410 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 400 may consist of the remediation system 101. The processor 402 may be disposed in communication with the communication network 411 via a network interface 403. The network interface 403 may communicate with the communication network 411. The network interface 403 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 411 may include, without limitation, a direct interconnection, local area network (LAN), wide area network (WAN), wireless network (e.g., using Wireless Application Protocol), the Internet, etc. Using the network interface 403 and the communication network 411, the computer system 400 may communicate with one or more data sources 412 for performing remediation for managing vulnerabilities in the application. The network interface 403 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 411 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface 406, an operating system 407 etc. In some embodiments, computer system 400 may store user/application data 406, such as, the data, variables, records, etc., as described in this disclosure. Such databases may be implemented as fault-tolerant, relational, scalable, secure databases such as Oracle® or Sybase®.

The operating system 407 may facilitate resource management and operation of the computer system 400. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTUM™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 400 may implement a web browser 408 stored program component. The web browser 408 may be a hypertext viewing application, such as Microsoft Internet Explorer, Google Chrome, Mozilla Firefox, Apple Safari, etc. Secure web browsing may be provided using Hypertext Transport Protocol Secure (HTTPS), Secure Sockets Layer (SSL), Transport Layer Security (TLS), etc. Web browser 408 may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as ASP, ActiveX, ANSI C++/C#, Microsoft .NET, Common Gateway Interface (CGI) scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure provisions a method for performing remediation for managing vulnerabilities of an application. The present disclosure automatically generates security patches for performing remediation.

An embodiment of the present disclosure reduces effort to identify and implement a security patch to remediate the identified vulnerability in an application by automating the process.

An embodiment of the present disclosure improves accuracy of the patch generation without introduction of new code weakness. This is achieved by identifying additional exploits as well as weakness in the source code and generating additional test cases for these exploits, executing all the identified test cases to confirm no new vulnerabilities are present.

An embodiment of the present disclosure provides self-optimizing option for identifying optimal code commits leveraging cut off criteria that are regenerated by using the exploit details.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

An "article of manufacture" includes non-transitory computer readable medium, and/or hardware logic, in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Remediation system |
| 102 | One or more data sources |
| 103 | Processor |
| 104 | I/O interface |
| 105 | Memory |
| 106 | Modules |
| 107 | Data |
| 201 | Receiving module |
| 202 | Commit-log identifying module |
| 203 | Path generating module |
| 204 | Determining module |
| 205 | Remediating module |
| 206 | Other modules |
| 207 | Input data |
| 208 | Commit-log data |
| 209 | Patch data |
| 210 | Other data |
| 211 | Vulnerability data repository |
| 212 | Code commit data repository |
| 213 | Code commit test case data repository |
| 214 | Exploit test case data repository |
| 215 | Code coverage data repository |
| 216 | Code weakness repository |
| 217 | Remediation code repository |
| 400 | Computer system |
| 401 | I/O Interface |
| 402 | Processor |
| 403 | Network interface |
| 404 | Storage interface |
| 405 | Memory |
| 406 | User interface |
| 407 | Operating system |

-continued

| Reference Number | Description |
| --- | --- |
| 408 | Web browser |
| 409 | Input devices |
| 410 | Output devices |
| 411 | Communication network |
| 412 | One or more data sources |

What is claimed is:

1. A method of performing remediation for managing vulnerabilities in an application, the method comprising:
receiving, by a processor of a remediation system, data related to one or more source code associated with a plurality of vulnerabilities and a target source code of an application, from one or more data sources for generating a remediation workflow for the one or more source code;
identifying, by the processor of the remediation system, a commit-log comprising a plurality of code commits for the plurality of vulnerabilities of the one or more source code, wherein the identification comprises:
extracting, by the processor of the remediation system, one or more features associated with each code commit of the commit-log from the one or more data sources; and
extracting, by the processor of the remediation system, one or more test cases for each code commit based on the one or more features and exploit code associated with each code commit from the one or more data sources;
generating, by the processor of the remediation system, scripts for a traversal path between the one or more source code to the target source code based on the remediation workflow, by populating the one or more features associated with each code commit with a corresponding test case;
determining, by the processor of the remediation system, a lower bound limit and an upper bound limit in the traversal path to identify one or more optimal code commits log from the commit-log based on the extracted one or more test cases; and
performing, by the processor of the remediation system, remediation for the one or more source code by generating one or more security patches for the one or more optimal code commits log based on criteria associated with the plurality of vulnerabilities of the one or more source code.

2. The method as claimed in claim 1, wherein the data comprises vulnerability data and configuration data related to the one or more source code and the target source code.

3. The method as claimed in claim 1, wherein the one or more data sources comprises a plurality of databases.

4. The method as claimed in claim 1, wherein determining the lower bound limit and the upper bound limit in the traversal path comprises:
identifying, by the processor of the remediation system, the lower bound limit by traversing from the one or more source code to the target source code and eliminating one or more code commits from the commit-log based on failure of exploit test cases associated with the one or more code commits; and
identifying, by the processor of the remediation system, the upper bound limit by traversing from the target source code to the one or more source code and eliminating features of the target source code based on failure of test cases related to the features.

5. The method as claimed in claim 1, wherein the criteria are determined by:
obtaining, by the processor of the remediation system, one or more exploit test cases associated with the one or more optimal code commits log from the one or more data sources; and
determining, by the processor of the remediation system, the criteria based on the one or more exploit test cases, wherein the criteria comprise a critically criticality value and a code coverage value for the plurality of vulnerabilities of the one or more source code.

6. The method as claimed in claim 1, wherein generating the one or more security patches comprises:
identifying, by the processor of the remediation system, a weakness pattern between the one or more source code and the target source code based on weakness information of the one or more source code obtained from the one or more data sources;
extracting, by the processor of the remediation system, information associated with the weakness pattern from the one or more data sources; and
generating, by the processor of the remediation system, the one or more security patches for the one or more optimal code commits log based on the weakness pattern and the corresponding information.

7. The method as claimed in claim 1 further comprising:
validating, by the processor of the remediation system, the one or more security patches by executing the one or more security patches for the one or more optimal code commits log.

8. A remediation system of performing remediation for managing vulnerabilities in an application, comprising:
a processor; and
a memory communicatively coupled to the processor, wherein the memory stores processor-executable instructions, which, on execution, cause the processor to:
receive data related to one or more source code associated with a plurality of vulnerabilities and a target source code of an application, from one or more data sources for generating a remediation workflow for the one or more source code;
identify a commit-log comprising a plurality of code commits for the plurality of vulnerabilities of the one or more source code, wherein the identification comprises:
extracting one or more features associated with each code commit of the commit-log from the one or more data sources; and
extracting one or more test cases for each code commit based on the one or more features and exploit code associated with each code commit from the one or more data sources;
generate scripts for a traversal path between the one or more source code to the target source code based on the remediation workflow, by populating the one or more features associated with each code commit with a corresponding test case;
determine a lower bound limit and an upper bound limit in the traversal path to identify one or more optimal code commits log from the commit-log based on the extracted one or more test cases; and
perform remediation for the one or more source code by generating one or more security patches for the one or more optimal code commits log based on criteria associated with the plurality of vulnerabilities of the one or more source code.

9. The remediation system as claimed in claim 8, wherein the data comprises vulnerability data and configuration data related to the one or more source code and the target source code.

10. The remediation system as claimed in claim 8, wherein the one or more data sources comprises a plurality of databases.

11. The remediation system as claimed in claim 8, wherein the processor is configured to determine the lower bound limit and the upper bound limit in the traversal path by:
identifying the lower bound limit by traversing from the one or more source code to the target source code and eliminating one or more code commits from the commit-log based on failure of exploit test cases associated with the one or more code commits; and
identifying the upper bound limit by traversing from the target source code to the one or more source code and eliminating features of the target source code based on failure of test cases related to the features.

12. The remediation system as claimed in claim 8, wherein the processor is configured to determine criteria by:
obtaining one or more exploit test cases associated with the one or more optimal code commits log from the one or more data sources; and
determining the criteria based on the one or more exploit test cases, wherein the criteria comprise a criticality value and a code coverage value for the plurality of vulnerabilities of the one or more source code.

13. The remediation system as claimed in claim 8, wherein the processor is configured to generate the one or more security patches by:
identifying a weakness pattern between the one or more source code and the target source code based on weakness information of the one or more source code obtained from the one or more data sources;
extracting information associated with the weakness pattern from the one or more data sources; and
generating the one or more security patches for the one or more optimal code commits log based on the weakness pattern and the corresponding information.

14. The remediation system as claimed in claim 8, wherein the processor is configured to perform:
validating the one or more security patches by executing the one or more security patches for the one or more optimal code commits log.

15. A non-transitory computer readable medium including instruction stored thereon that when processed by at least one processor cause a remediation system to perform operation comprising:
receiving, by a processor of remediation system, data related to one or more source code associated with a plurality of vulnerabilities and a target source code of an application, from one or more data sources for generating a remediation workflow for the one or more source code;
identifying, by the processor of the remediation system, a commit-log comprising a plurality of code commits for the plurality of vulnerabilities of the one or more source code, wherein the identification comprises:
extracting, by the processor of the remediation system, one or more features associated with each code commit of the commit-log from the one or more data sources; and extracting, by the processor of the remediation system, one or more test cases for each code commit based on the one or more features and exploit code associated with each code commit from the one or more data sources;

generating, by the processor of the remediation system, scripts for a traversal path between the one or more source code to the target source code based on the remediation workflow, by populating the one or more features associated with each code commit with a corresponding test case;

determining, by the processor of the remediation system, a lower bound limit and an upper bound limit in the traversal path to identify one or more optimal code commits log from the commit-log based on the extracted one or more test cases; and performing, by the processor of the remediation system, remediation for the one or more source code by generating one or more security patches for the one or more optimal code commits log based on criteria associated with the plurality of vulnerabilities of the one or more source code.

16. The non-transitory computer readable medium as claimed in claim 15, including instruction stored thereon that when processed by at least one processor cause the remediation system to perform operation comprising determining the lower bound limit and the upper bound limit in the traversal path by:

identifying, by the processor of the remediation system, the lower bound limit by traversing from the one or more source code to the target source code and eliminating one or more code commits from the commit-log based on failure of exploit test cases associated with the one or more code commits; and identifying, by the processor of the remediation system, the upper bound limit by traversing from the target source code to the one or more source code and eliminating features of the target source code based on failure of test cases related to the features.

17. The non-transitory computer readable medium as claimed in claim 15, including instruction stored thereon that when processed by at least one processor cause the remediation system to perform operation comprising determining the criteria by:

obtaining, by the processor of the remediation system, one or more exploit test cases associated with the one or more optimal code commits log from the one or more data sources; and determining, by the processor of the remediation system, the criteria based on the one or more exploit test cases, wherein the criteria comprise a criticality value and a code coverage value for the plurality of vulnerabilities of the one or more source code.

18. The non-transitory computer readable medium as claimed in claim 15, including instruction stored thereon that when processed by at least one processor cause the remediation system to perform operation comprising generating the one or more security patches by:

identifying, by the processor of the remediation system, a weakness pattern between the one or more source code and the target source code based on weakness information of the one or more source code obtained from the one or more data sources;

extracting, by the processor of the remediation system, information associated with the weakness pattern from the one or more data sources; and generating, by the processor of the remediation system, the one or more security patches for the one or more optimal code commits log based on the weakness pattern and the corresponding information.

\* \* \* \* \*